United States Patent [19]

Jang et al.

[11] Patent Number: 5,251,357
[45] Date of Patent: Oct. 12, 1993

[54] WINDSHIELD WIPER BLADE WITH DEFORMABLE INTERNAL CAVITY

[75] Inventors: Sei J. Jang, Ellicott City; In J. Lee, Baltimore, both of Md.

[73] Assignee: Alberee Ltd., Inc., Baltimore, Md.

[21] Appl. No.: 870,237

[22] Filed: Apr. 20, 1992

Related U.S. Application Data

[63] Continuation of Ser. No. 695,110, May 3, 1991, abandoned.

[51] Int. Cl.$^5$ .............................. B60S 1/28; B60S 1/38
[52] U.S. Cl. .................................. 15/250.4; 15/250.36
[58] Field of Search ........... 15/250.36, 250.41, 250.42, 15/250.01, 250.04, 250.06, 245, 250.40; D12/155

[56] References Cited

U.S. PATENT DOCUMENTS

| Re. 24,974 | 4/1961 | Krohm | 15/250.42 |
|---|---|---|---|
| 2,039,716 | 5/1936 | Horton | 15/245 |
| 2,090,681 | 8/1937 | Kempel | 15/245 |
| 2,090,702 | 8/1937 | Rodrick | 15/245 |
| 2,179,451 | 11/1939 | Horton | 15/250.42 |
| 2,583,710 | 1/1945 | Scinta | 15/250.36 |
| 2,596,063 | 5/1952 | Anderson | 15/250.42 |
| 2,782,444 | 2/1957 | Krohm | 15/250.36 |
| 2,782,445 | 2/1957 | Krohm | 15/245 |
| 2,814,820 | 12/1957 | Elliott et al. | 15/250.42 |
| 2,983,945 | 5/1961 | De Pew | 15/250.42 |
| 3,006,018 | 10/1961 | Golub et al. | 15/250.42 |
| 3,031,709 | 5/1962 | Easterling | 15/250.42 |
| 3,116,506 | 1/1964 | Browne et al. | 15/250.36 |
| 3,399,419 | 9/1968 | Wise | 15/250.42 |
| 3,408,680 | 11/1968 | Heller | 15/250.42 |
| 3,566,432 | 3/1971 | Quinlan et al. | 15/250.36 |
| 3,735,443 | 5/1973 | Deutscher et al. | 15/250.42 |
| 3,780,395 | 12/1973 | Quinlan et al. | 15/250.36 |
| 3,785,002 | 1/1974 | Quinlan et al. | 15/250.36 |
| 3,881,212 | 5/1975 | Regler | 15/250.36 |
| 4,473,919 | 10/1984 | Fritz, Jr. | 15/250.36 |

FOREIGN PATENT DOCUMENTS

| 970911 | 9/1975 | Canada | 15/250.36 |
|---|---|---|---|
| 1207228 | 12/1965 | Fed. Rep. of Germany | 15/250.36 |
| 2101271 | 6/1973 | Fed. Rep. of Germany | 15/250.36 |
| 59350 | 1/1954 | France | 15/250.36 |
| 67467 | 10/1957 | France | 15/250.36 |
| 666548 | 2/1952 | United Kingdom | 15/250.36 |
| 760378 | 10/1954 | United Kingdom | |
| 1269993 | 5/1972 | United Kingdom | |
| 1460202 | 12/1976 | United Kingdom | |

Primary Examiner—Harvey C. Hornsby
Assistant Examiner—Gary K. Graham

[57] ABSTRACT

A windshield wiper blade construction for use in a windshield wiper assembly for motor vehicles, which comprises a T-shaped mounting portion and a triangular wiper squeegee portion including a vertically elongated rectangular cavity disposed in the center thereof, both sides thereof having projecting edges, and an elongated lip. An angle of about 12° to 18° is provided between a line connecting an edge of the lower elongated lip and an uppermost third edge and a center line of the elongated lip. This construction provides for efficiently wiping and cleaning the windshield and extending the operational life thereof.

8 Claims, 1 Drawing Sheet

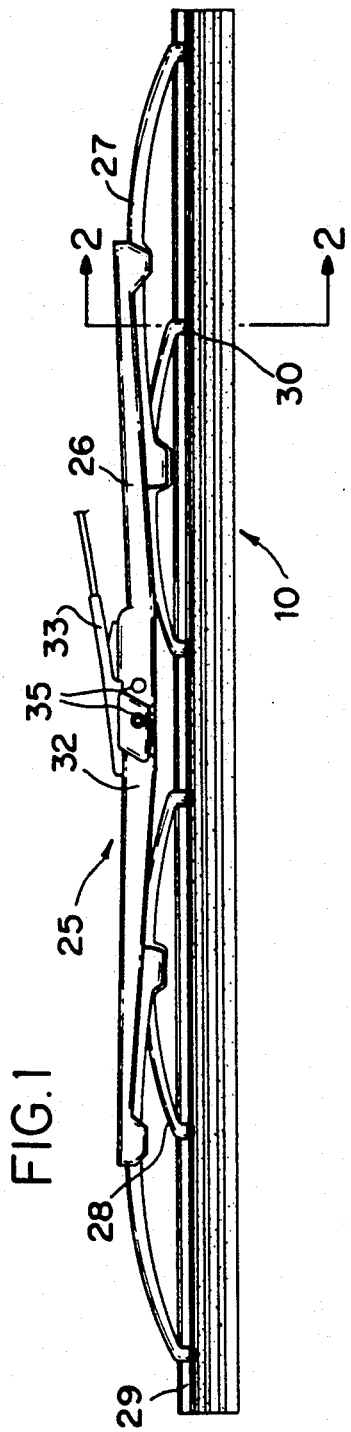
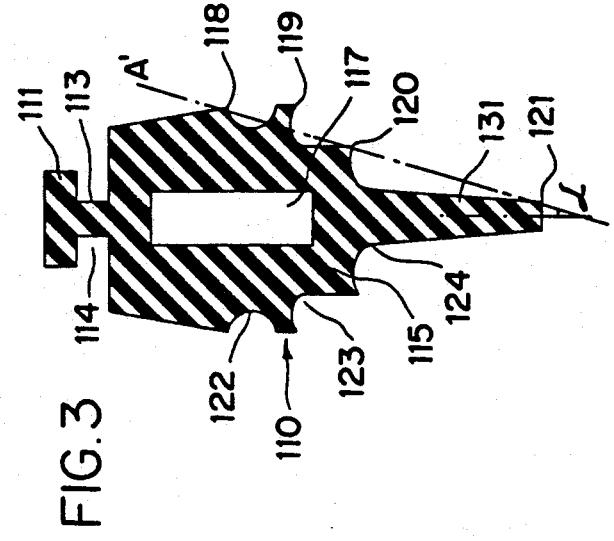
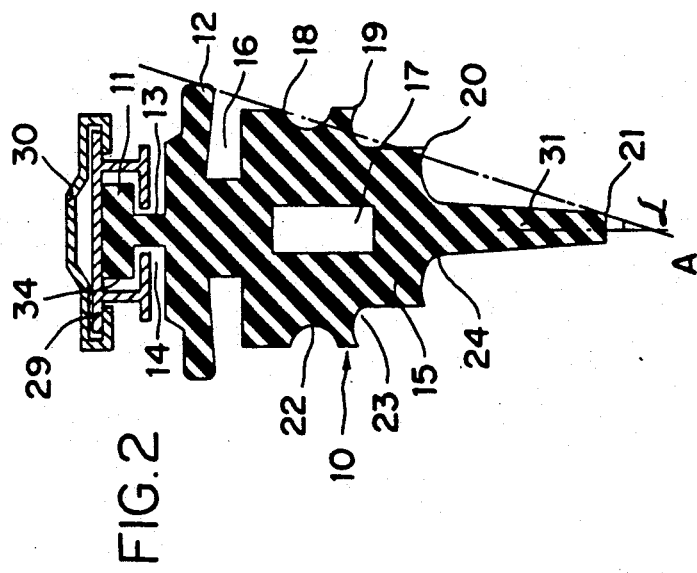

WINDSHIELD WIPER BLADE WITH DEFORMABLE INTERNAL CAVITY

This application is a continuation of application Ser. No. 07/695,10 filed on May 3, 1991, now abandoned.

BACKGROUND OF THE INVENTION

1. Field of the Invention

The present invention relates generally to the construction of windshield wiper blades and more particularly, to an improved windshield wiper blade for a windshield wiper assembly for vehicles such as motor vehicles, which comprises a triangular wiper squeegee portion including a longitudinal rectangular cavity disposed in the center thereof, an upper elongated lip, a plurality of wiping edges, and a plurality of concave portions connecting with the wiping edges whereby a wiper blade is provided which exhibits a long operational life while achieving an effective cleaning operation.

2. Description of the Prior Art

Various types of windshield wiper blades for a windshield wiper assembly are well known. Such windshield wiper blades have only a plurality of edges as shown in U.S. Pat. No. 2,782,444, U.S. Pat. No. 2,782,445, U.S. Pat. Re.24,974, and U.S. Pat. No. 3,735,443, a hollow core disposed in the center of a wiper squeegee as shown in U.S. Pat. No. 3,566,432, and a elongated lip as shown in U.S. Pat. No. 2,583,710, U.S. Pat. No. 2,596,063, and U.S. Pat. No. 3,006,018. However, these conventional windshield wiper blades do not process a long operation life, do not clearly wipe and clean the windshield, and are difficult to operate under heavy snow and ice conditions.

SUMMARY OF THE INVENTION

Accordingly, it is an object of the present invention to provide an improved windshield wiper blade or refill for use in a windshield wiper assembly for motor vehicles.

Another object of the present invention is to provide a windshield wiper blade including a T-shaped mounting portion for smoothly and tightly engaging the mounting stays of a windshield wiper frame, and a triangular wiper squeegee portion wherein the sides of the wiper squeegee have projecting wiping edges disposed between lip edges and uppermost edges and three concave portions are disposed between the edges for efficiently wiping the windshield and extending the operational life thereof.

A further object of the present invention is to provide a windshield wiper blade including a vertically elongated rectangular cavity disposed in the center of a wiper squeegee portion and containing symmetrical edges with an angle of about 12° to 18° being provided between a line connecting an edge of a lower elongated lip and an uppermost third edge and a center line of the elongated lip for efficiently cleaning the windshield due to a strong back and forth motion thereof and also extending the operational life thereof.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a windshield wiper blade construction for use in a windshield wiper assembly for motor vehicles, which comprises a T-shaped mounting portion and a triangular wiper squeegee portion including a vertically elongated rectangular cavity disposed in the center thereof, edges projecting from both sides, and an elongated lip with an angle of about 12° to 18° being provided between a line connecting an edge of the lower elongated lip and an uppermost third edge and a center line of the elongated lip for efficiently wiping and cleaning the windshield and extending the operation life thereof.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side view in elevation of the complete windshield wiper blade assembly according to the present invention;

FIG. 2 is a section on an enlarged scale along the line 2—2 of FIG. 1; and

FIG. 3 is a section on an enlarged scale along the line 2—2 of FIG. 1 showing another embodiment of the present invention.

DESCRIPTION OF THE PREFERRED EMBODIMENTS

Referring now in detail to the drawings for the purpose of illustrating preferred embodiments of the present invention, the windshield wiper blade for use in a windshield wiper assembly for motor vehicles as shown in FIGS. 1, 2, and 3, comprises a triangular wiper squeegee portion 10 having a generally longitudinally elongated configuration in cross-section and a mounting portion 11 and web 13 together having a T-shaped configuration for smoothly and tightly receiving a mounting stay 29 of a conventional wiper frame 25.

As shown in FIG. 2, the squeegee portion 10 extends to the mounting portion 11 through a web 13 as an intermediate restricted portion. Horizontally extending arms 12 define longitudinal grooves 16. The web 13 is preferably formed by providing the sides of the element with a pair of substantially corresponding longitudinal dovetail-like grooves or recesses 14 for readily and tightly receiving the mounting stays 29. The squeegee and mounting portions 10 and 11 are made of synthetic elastomeric or silicone materials.

The elongated wiper squeegee portion 10 includes a longitudinally bendable lip 31 as a longitudinal necked windshield contacting portion having bottom lip edges 21 for wiping and cleaning a windshield (not shown), and symmetrical uppermost edges 18 disposed at the upper portion thereof for contacting a portion of the windshield, respectively. Also, between the uppermost edges 18 and lip edges 21, there are two projecting edges 19 and 20 and three concave portions 22, 23, and 24 disposed between edges 18, 19, 20, and 21, respectively, whereby the projecting edges 19 and 20 can forcefully contact the windshield for wiping and cleaning debris, leaves, dirt, mud, ice, snow etc, and the concave portions 22, 23, and 24 do not hold the moisture when the windshield wiper swings back, whereby the windshield is completely and efficiently cleaned.

The squeegee portion 10 further includes a longitudinally disposed, rectangular cavity 17 for providing an efficient cushion action so as to give flexibility and constant pressure to the bendable lip 31 and assure proper contact of the wiping edges 18, 19, 20, and 21 with the windshield or the debris thereon along with the entire length of the blade.

In detail, while the edge 18 and the concave portion 22 are specifically used for removing and separating the large debris, ice, snow etc from the windshield, the edges 19 and 20 and the concave portions 22, 23 and 24 are specifically used for dispersing and releasing moisture away from the lip edges 21, respectively. The extending arms 12 also have a wiping function and both grooves 16 provides an optimum wiping angle of about 30° to 45° during the operation of the wipershield assembly. The rectangular configured cavity 17 can easily and quickly return to an original form from a deformed state during the wiping of the windshield when compared with circular, triangular, pear-shaped, and T-shaped configured cores of the conventional windshield wiper blades.

The squeegee portion 10 has a triangular configuration provided with an angle α of about 12° to 18°, preferably about 15°, wherein the angle α, is defined as being the angle between a line A connecting the uppermost edge 18 to the lip edge 21, and a center line of the bendable lip 31 as shown in FIG. 2. The angle α of the squeegee portion 10 provides an optimal condition for all edges 18, 19, 20, and 21 or the edges of the extending arms 12 for efficiently wiping and cleaning the windshield. Also, during the operation of the windshield wiper assembly, two projecting edges 19 and 20 can scrape the surface of the windshield better since the length of these edges is longer than that of the uppermost edges 18 and lip edges 21 as shown by the line A (FIG. 2).

The conventional windshield wiper frame 25 generally includes a bridge member 26 having a connector 32 and an arm 33, first yokes 27 pivotably connected to the bridge member 26, second yokes 28 pivotably connected to the first yokes 27, and the mounting stays 29 movably connected to clips 30 extended from ends of the first and second yokes 27 and 28. The mounting stays 29 has horizontally elongated channel 34 for smoothly and tightly receiving the horizontally T-shaped, elongated head 11.

FIG. 3 is a cross-sectional view illustrating another embodiment of the windshield wiper blade of the present invention. The modification of the present invention shown in FIG. 3 of the drawing is similar to the construction of the present invention shown in FIG. 2 in that the windshield wiper blade includes a T-shaped mounting portion 111 and an elongated squeegee portion 110 directly connected to a web 113. More specifically in this regard, the squeegee portion 110 has a triangular configuration containing a longitudinally bendable lip 131 with edges 121 and uppermost edges 118, two projecting edges 119 and 120, and three concave portions disposed between the edges 118, 119, 120, and 121. The embodiment of FIG. 3 does not have extending arms and horizontal grooves when compared with the windshield wiper blade of the present invention shown in FIG. 2. All other elements of FIG. 3 have similar functions to that of the first embodiment of the present invention.

The windshield wiper blade according to the present invention operates as follows.

When the windshield wiper blade moves on the windshield in a wiping direction, the rectangular configured cavity 17 is deformed. Inherently, one of the cavity 17 is shifted in the wiping direction and the resultant deformation of the squeegee portion 10 increases the pressure to the bendable lip 31 and further to edges 18, 19, and 20, particularly to the projecting edges 19 and 20 since the extension length of the projecting edges 19 and 20 are longer than that of the edges 18 and 21 based on the line A (FIG. 2). When the windshield wiper blade swings back, the edges 18, 19, 20, and 21 remove and wipe the debris, mud, dirt, snow, ice etc and then the concave portions 22, 23, and 24 do not hold moisture for efficiently wiping and cleaning the windshield. The windshield wiper blade of FIG. 3 has the same as the function as the first embodiment of the present invention.

More specially in this regard, the windshield wiper blade of FIG. 3 of the present invention has a long rectangular cavity 117 instead of the pair of arms 12 of wiper blade of the first embodiment of the present invention so that the windshield wiper blade of FIG. 3 can efficiently wipe and clean the windshield similarly as the first embodiment of the present invention.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A windshield wiper blade for use in a windshield wiper assembly for vehicles, which comprises,
   a body,
   a mounting member permitting smooth and tight mounting within a windshield wiper frame,
   a web connecting said body to said mounting member,
   said body including a squeegee member having a first side and a second side,
   said squeegee member including a bendable elongated lip,
   means for wiping and cleaning a windshield,
   said means being located on each of said first side and said second side of said squeegee member,
   said means including an end edge on said bendable elongated lip on each of said first side and said second side,
   said means also including on each of said first side and said second side a first projecting edge connected to said bendable elongated lip by a first concave portion of said side, a second projecting edge connected to said first projecting edge by a first straight portion of said side and a second concave portion of said side, and an uppermost third projecting edge connected to said second projecting edge by a second straight portion of said side, and a third concave portion of said side,
   said first and second projecting edges jut out beyond said line connecting said lip end edge and said uppermost third edge,
   a longitudinally disposed, rectangular cavity, made up of only four straight sides when viewed in a plane of a transverse cross section taken through said squeegee member, disposed in a center of said squeegee member for providing an efficient cushion action so as to give flexibility and constant pressure to said wiping and cleaning means, said bendable elongated lip having a center line extending from between the lip edges to the mounting member, and a line on each of said first side and said second side drawn in a plane of a transverse cross section of said squeegee member connecting one said lip end edge and said uppermost third edge being at an angle of about 12° to 18° to the center line of said bendable elongated lip so that said squeegee member has a substantially triangular configuration.

2. A windshield wiper blade as recited in claim 1 wherein a horizontally extending arm is disposed on each side of said body and is separated from said squeegee member by a groove.

3. The windshield wiper blade of claim 2, wherein said squeegee member has a longitudinally elongated configuration and is progressively narrow in across-section in a direction toward said bendable elongated lip.

4. The windshield wiper blade of claim 2, wherein said angle is about 15°.

5. The windshield wiper blade of claim 2, wherein said mounting member and said web together have a T-shaped configuration.

6. The windshield wiper blade of claim 1, wherein said mounting member and said web together have a T-shaped configuration.

7. The windshield wiper blade of claim 1, wherein said squeegee member has a longitudinally elongated configuration and is progressively narrow in cross-section in a direction toward said bendable elongated lip.

8. The windshield wiper blade of claim 1, wherein said angle is about 15°.

* * * * *